(12) United States Patent
Samaroo

(10) Patent No.: US 8,695,736 B1
(45) Date of Patent: Apr. 15, 2014

(54) BIN MOVING ASSEMBLY

(76) Inventor: Devindranath Samaroo, Toronto (CA)

( * ) Notice: Subject to any disclaimer, the term of this patent is extended or adjusted under 35 U.S.C. 154(b) by 0 days.

(21) Appl. No.: 13/598,814

(22) Filed: Aug. 30, 2012

(51) Int. Cl.
*B62D 51/04* (2006.01)
*B62B 1/14* (2006.01)

(52) U.S. Cl.
USPC ............................................. 180/11; 414/810

(58) Field of Classification Search
USPC ................. 180/11, 14.1, 14.2, 15, 19.1, 19.3; 280/43.12, 47.131, 47.17, 47.19, 79.7, 280/81.5, 82, 83; 414/810, 453
See application file for complete search history.

(56) References Cited

U.S. PATENT DOCUMENTS

| | | | |
|---|---|---|---|
| 3,208,614 A * | 9/1965 | Armitage et al. | 414/447 |
| 3,399,903 A | 9/1968 | Bailey | |
| 4,179,132 A | 12/1979 | Rich | |
| D271,718 S | 12/1983 | Johno, Jr. et al. | |
| 4,797,050 A * | 1/1989 | Habicht | 414/420 |
| 5,380,033 A | 1/1995 | Harling | |
| 5,860,659 A | 1/1999 | Hart | |
| 5,893,572 A | 4/1999 | Parks | |
| 6,309,167 B1 * | 10/2001 | Mc Pherrin | 414/457 |
| 6,406,996 B1 * | 6/2002 | Bernard et al. | 438/653 |
| 6,511,080 B2 * | 1/2003 | Lee | 280/43.12 |
| 6,758,291 B1 * | 7/2004 | Koch | 180/11 |
| 7,018,155 B1 * | 3/2006 | Heberling et al. | 414/408 |
| 7,350,790 B1 * | 4/2008 | Wilson | 280/47.131 |
| 7,597,522 B2 * | 10/2009 | Borntrager et al. | 414/347 |
| 7,621,356 B2 * | 11/2009 | Quarberg | 180/12 |
| 8,251,248 B1 * | 8/2012 | Holmes | 220/759 |
| 8,485,773 B2 * | 7/2013 | Coats | 414/453 |
| 2003/0194303 A1 * | 10/2003 | Lunger | 414/444 |
| 2004/0232184 A1 * | 11/2004 | Moen et al. | 224/510 |
| 2007/0209846 A1 | 9/2007 | Wilson | |
| 2012/0160576 A1 * | 6/2012 | Anasiewicz | 180/19.1 |
| 2013/0062128 A1 * | 3/2013 | Johnson | 180/11 |

* cited by examiner

*Primary Examiner* — Tony Winner

(57) ABSTRACT

A bin moving assembly is provided for tipping and moving upright wheeled recycling bins. The assembly includes a jack and a pair of wheels coupled to the jack. A fork is coupled to and extends from the jack. The jack selectively extends the fork upwardly whereby the fork is configured for engaging and tipping an upright wheeled recycling bin. A handle is coupled to the jack to facilitate moving the jack when the fork engages the bin whereby the bin is moved with the jack.

11 Claims, 5 Drawing Sheets

BIN MOVING ASSEMBLY

BACKGROUND OF THE DISCLOSURE

Field of the Disclosure

The disclosure relates to lifting devices and more particularly pertains to a new lifting device for tipping and moving upright wheeled recycling bins.

SUMMARY OF THE DISCLOSURE

An embodiment of the disclosure meets the needs presented above by generally comprising a jack and a pair of wheels coupled to the jack. A fork is coupled to and extends from the jack. The jack selectively extends the fork upwardly whereby the fork is configured for engaging and tipping an upright wheeled recycling bin. A handle is coupled to the jack to facilitate moving the jack when the fork engages the bin whereby the bin is moved with the jack.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
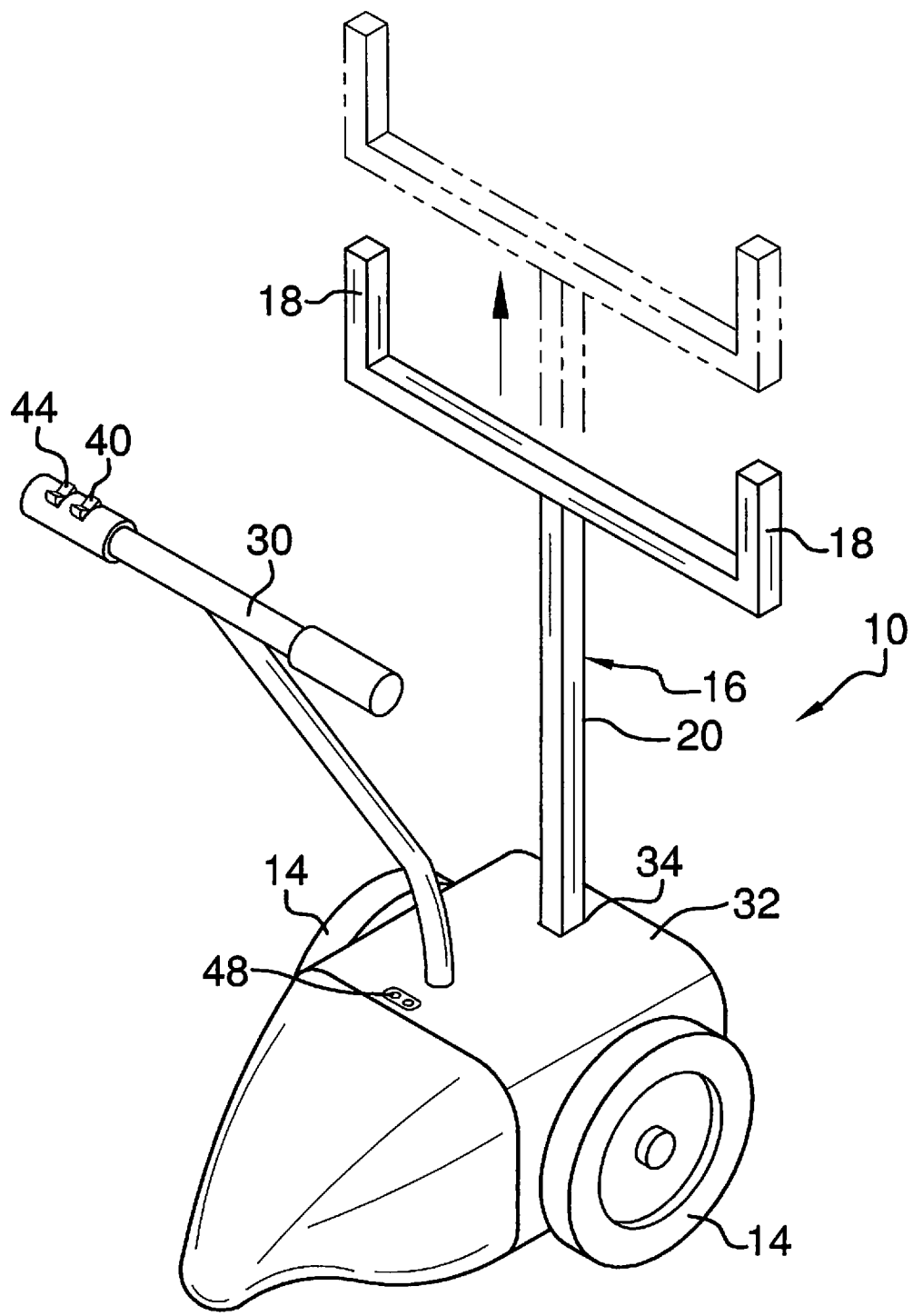
FIG. 1 is a top back side perspective view of a bin moving assembly according to an embodiment of the disclosure.
Figure 2:
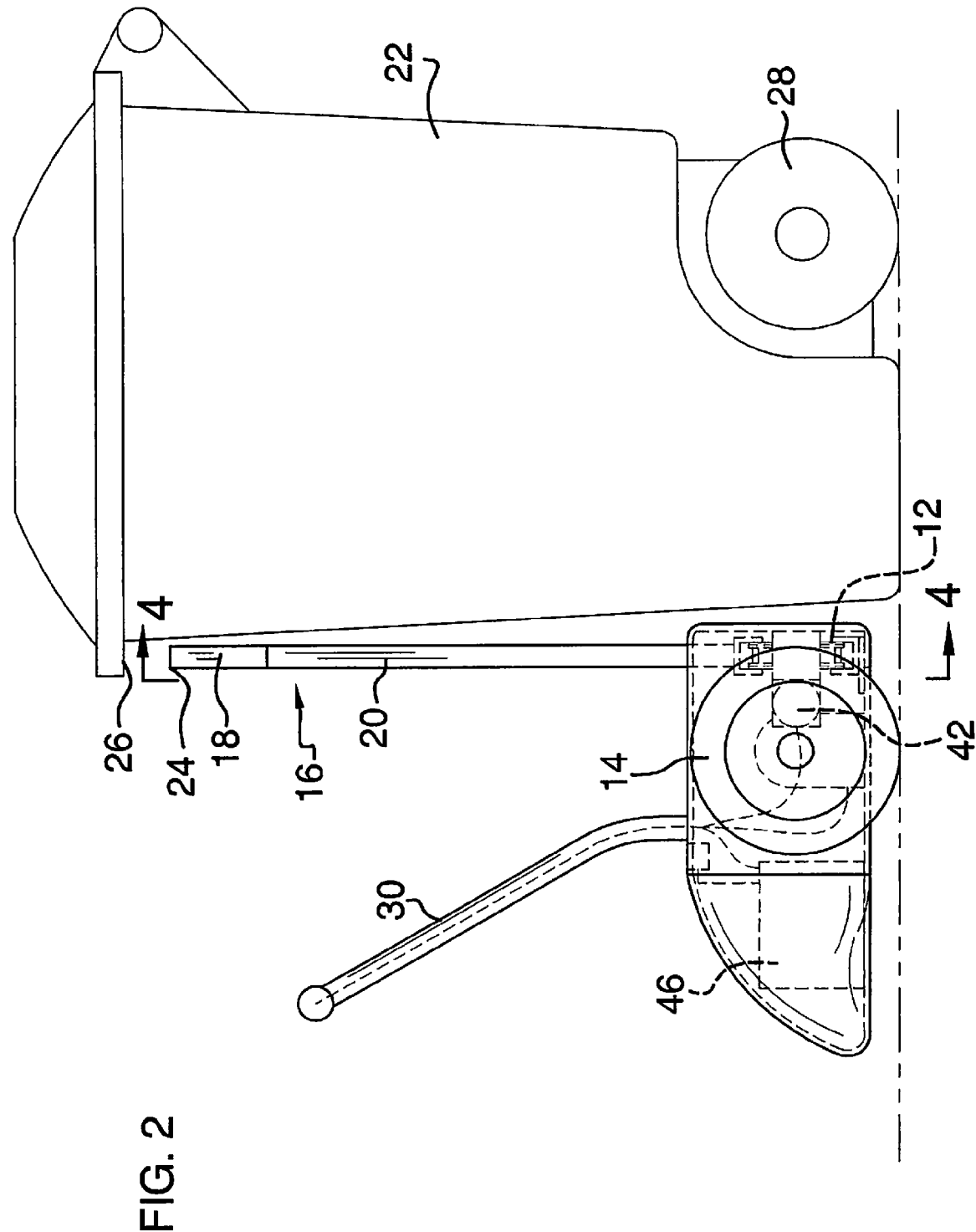
FIG. 2 is a side view of an embodiment of the disclosure.
Figure 3:
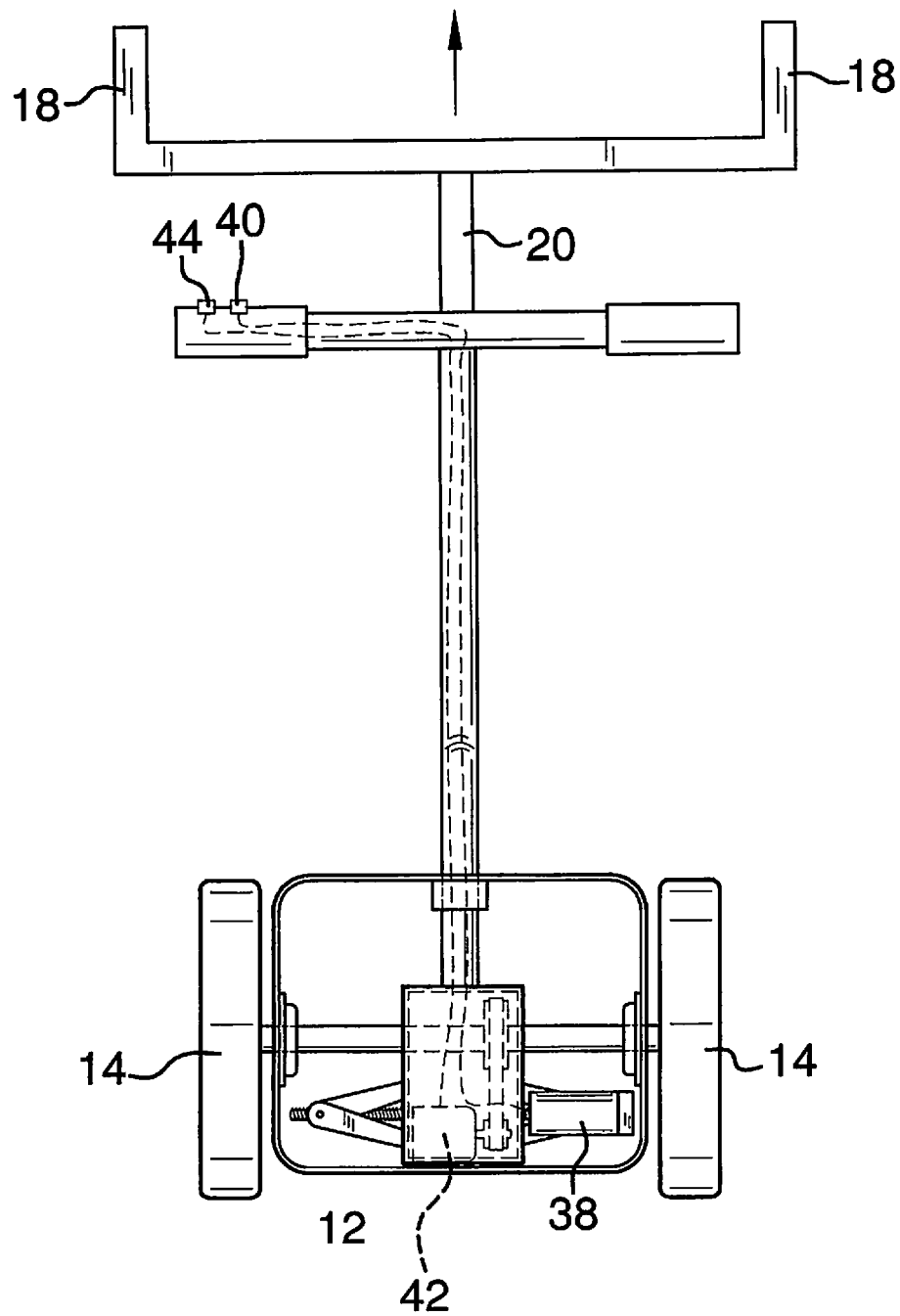
FIG. 3 is a back view of an embodiment of the disclosure.
Figure 4:
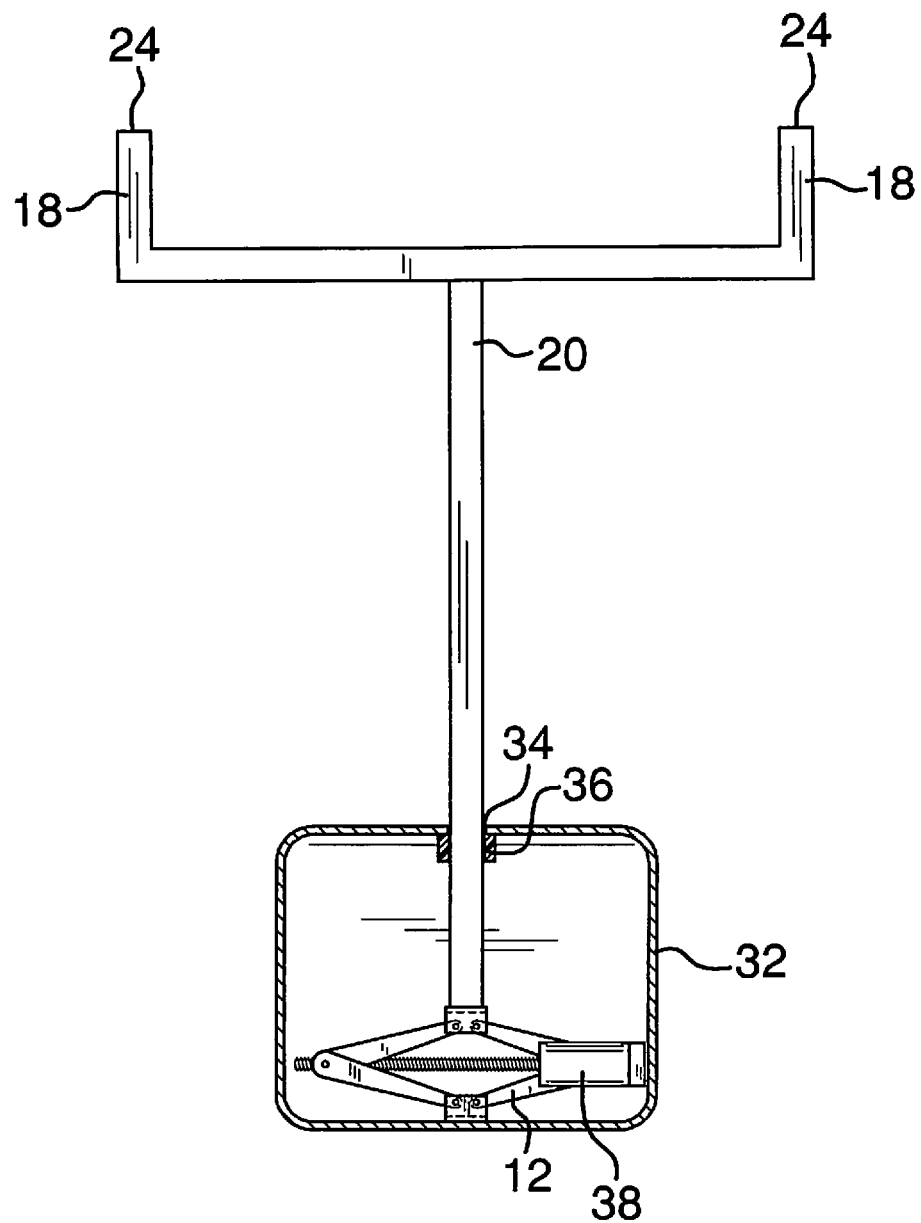
FIG. 4 is a cross-sectional view of an embodiment of the disclosure taken along line 4-4 of FIG. 2.
Figure 5:
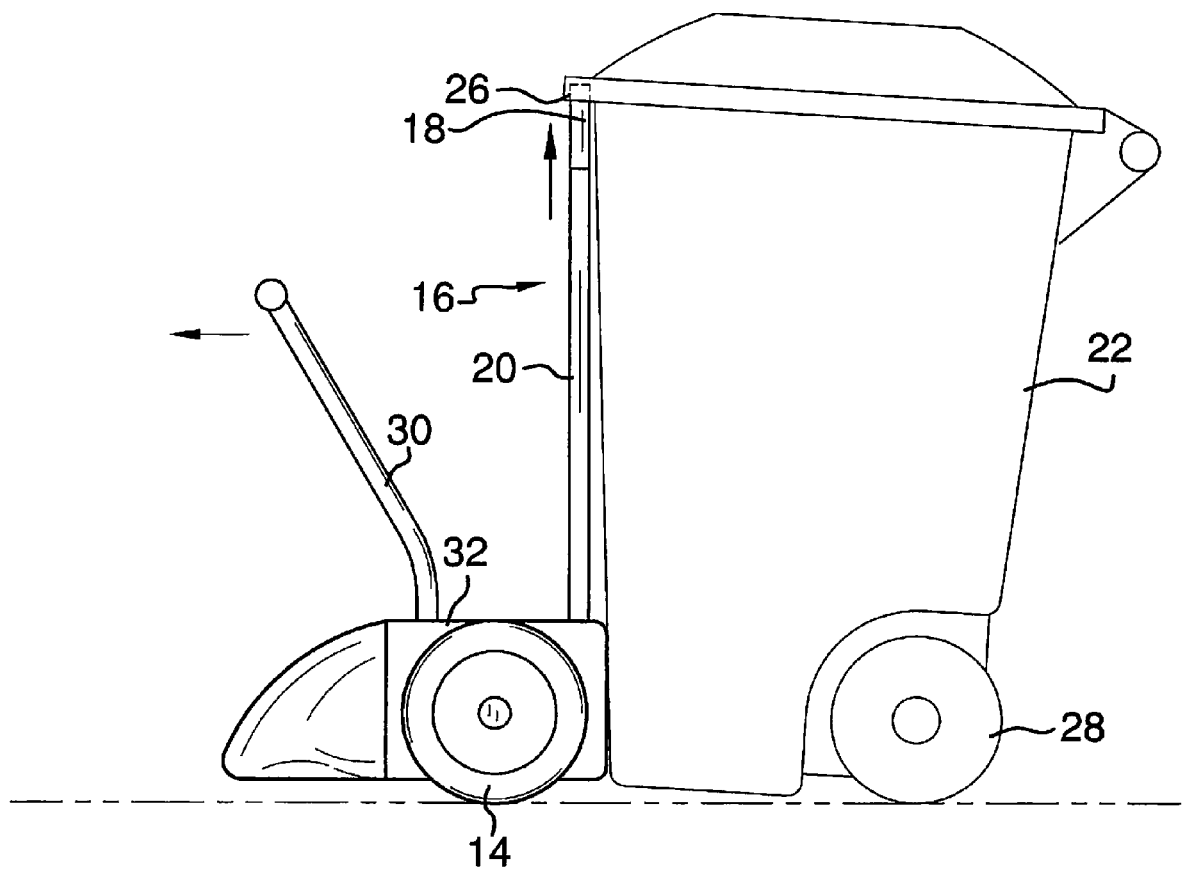
FIG. 5 is a side view of an embodiment of the disclosure in use.

With reference now to the drawings, and in particular to FIGS. 1 through 5 thereof, a new lifting device embodying the principles and concepts of an embodiment of the disclosure and generally designated by the reference numeral 10 will be described.

As best illustrated in FIGS. 1 through 5, the bin moving assembly 10 generally comprises a jack 12, which may be a scissor jack, and a pair of wheels 14 coupled to the jack 12. A fork 16 has a pair of spaced vertical arms 18 and a vertical post 20 extending down from the arms 18. The fork 16 is coupled to and extends away from the jack 12. The jack 12 selectively extends the fork 16 upwardly whereby the fork 16 is configured for engaging and tipping an upright wheeled recycling bin 22 by engagement of distal ends 24 of the spaced arms 18 against a lip 26 of the bin 22. By positioning the fork 16 opposite wheels 28 of the bin 22, the bin 22 is tipped into a position whereby moving the jack 12 on the wheels 14 moves the bin 22. A handle 30 is coupled to the jack 12 to facilitate moving the jack 12 when the fork 16 engages the bin 22. A housing 32 may be coupled to and extend around the jack 12. The fork 16 extends upwardly out of the housing 32 through an opening 34 in the housing 32. A bushing 36 is coupled to the housing 32 and aligned with the opening 34 in the housing 32. The vertical post 20 of the fork 16 extends through the bushing 36.

A jack motor 38 may be positioned in the housing 32 and operationally coupled to the jack 12. A jack switch 40 is coupled to the handle 30 and operationally coupled to the jack motor 38 to selectively raise and lower the fork 16. A drive motor 42 may also be coupled to and positioned in the housing 32. The drive motor 42 is operationally coupled to the wheels 14. A drive switch 44 is coupled to the handle 30. The drive switch 44 is operationally coupled to the drive motor 42 to selectively rotate the wheels 14 backward and forward. The drive switch 44 may be a rocker type switch with one side corresponding to moving forward and an opposite side corresponding to moving backward.

A rechargeable battery 46 is coupled to and positioned in the housing 32. The battery 46 is electrically coupled to the jack motor 38 and the drive motor 42. A charging port 48 may be coupled to the housing 32 and electrically coupled to the battery 46 to facilitate charging the battery 46.

In use, the jack 12 is moved by guiding the jack 12 while holding the handle 30 and operating the wheels 14 using the drive switch 44. When positioned adjacent to the bin 22, the fork 16 is extended upwardly by manipulation of the jack switch 40. The bin 22 is tipped and may be moved by further manipulation of the drive switch 42. When moved as desired, the fork 16 is lowered to disengage from the bin 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A bin moving assembly, comprising:
   a jack;
   a pair of wheels coupled to said jack;
   a fork coupled to and extending from said jack, said jack selectively extending said fork upwardly whereby said fork is configured for engaging and tipping an upright wheeled recycling bin, said fork including a vertically oriented post, a crossbar attached to an apex of said post and a pair of arms attached to said crossbar, said crossbar being horizontally oriented, each of said arms being vertically oriented and extending upwardly from said crossbar; and
   a handle coupled to said jack to facilitate moving said jack when said fork engages the bin whereby the bin is moved with the jack.

2. The assembly of claim 1, further including a housing coupled to and extending around said jack, said fork extending upwardly out of said housing through an opening in said housing.

3. The assembly of claim 2, further including a bushing coupled to said housing, said bushing being aligned with said opening in said housing, said fork extending through said bushing.

4. The assembly of claim 2, further including a jack motor positioned in said housing, said jack motor being operationally coupled to said jack.

5. The assembly of claim 4, further including a jack switch coupled to said handle, said jack switch being operationally coupled to said jack motor to selectively raise and lower said fork.

6. The assembly of claim 1, further including said jack being a scissor jack.

7. The assembly of claim 2, further including a drive motor coupled to and positioned in said housing, said drive motor being operationally coupled to said wheels.

8. The assembly of claim 7, further including a drive switch coupled to said handle, said drive switch being operationally coupled to said drive motor to selectively rotate said wheels backward and forward.

9. The assembly of claim 2, further comprising:
a jack motor positioned in said housing, said jack motor being operationally coupled to said jack;
a drive motor coupled to and positioned in said housing, said drive motor being operationally coupled to said wheels; and
a battery coupled to and positioned in said housing, said battery being electrically coupled to said jack motor and said drive motor.

10. The assembly of claim 9, further comprising:
said battery being rechargeable; and
a charging port coupled to said housing, said charging port being electrically coupled to said battery.

11. A bin moving assembly, comprising:
a scissor jack;
a pair of wheels coupled to said jack;
a fork coupled to and extending from said jack, said jack selectively extending said fork upwardly whereby said fork is configured for engaging and tipping an upright wheeled recycling bin;
a handle coupled to said jack to facilitate moving said jack when said fork engages the bin whereby the bin is moved with the jack;
a housing coupled to and extending around said jack, said fork extending upwardly out of said housing through an opening in said housing;
a bushing coupled to said housing, said bushing being aligned with said opening in said housing, said fork extending through said bushing;
a jack motor positioned in said housing, said jack motor being operationally coupled to said jack;
a jack switch coupled to said handle, said jack switch being operationally coupled to said jack motor to selectively raise and lower said fork;
a drive motor coupled to and positioned in said housing, said drive motor being operationally coupled to said wheels;
a drive switch coupled to said handle, said drive switch being operationally coupled to said drive motor to selectively rotate said wheels backward and forward;
a rechargeable battery coupled to and positioned in said housing, said battery being electrically coupled to said jack motor and said drive motor; and
a charging port coupled to said housing, said charging port being electrically coupled to said battery.

* * * * *